(12) United States Patent
Katsuramaki et al.

(10) Patent No.: US 9,653,902 B2
(45) Date of Patent: May 16, 2017

(54) FLAT CABLE WINDING DEVICE AND ASSEMBLING METHOD THEREOF

(71) Applicant: Yazaki Corporation, Minato-ku, Tokyo (JP)

(72) Inventors: Takahiko Katsuramaki, Susono (JP); Ryo Hamada, Susono (JP)

(73) Assignee: Yazaki Corporation, Minato-ku, Tokyo (JP)

( * ) Notice: Subject to any disclaimer, the term of this patent is extended or adjusted under 35 U.S.C. 154(b) by 141 days.

(21) Appl. No.: 14/459,868

(22) Filed: Aug. 14, 2014

(65) Prior Publication Data

US 2014/0353415 A1    Dec. 4, 2014

Related U.S. Application Data

(63) Continuation of application No. PCT/JP2013/053674, filed on Feb. 15, 2013.

(30) Foreign Application Priority Data

Feb. 16, 2012 (JP) .................................. 2012-031398
Nov. 9, 2012 (JP) .................................. 2012-247507
Feb. 14, 2013 (JP) .................................. 2013-027024

(51) Int. Cl.
  *B65H 75/48* (2006.01)
  *H02G 11/02* (2006.01)
  *B60R 16/027* (2006.01)

(52) U.S. Cl.
  CPC .......... *H02G 11/02* (2013.01); *B60R 16/027* (2013.01); *B65H 75/486* (2013.01); *Y10T 29/49826* (2015.01)

(58) Field of Classification Search
  CPC ............ B65H 75/4434; B65H 75/4471; H01R 35/025; H01R 2201/26
  See application file for complete search history.

(56) References Cited

U.S. PATENT DOCUMENTS

| | | | |
|---|---|---|---|
| 6,267,430 B1 | 7/2001 | Cresseaux | |
| 2015/0001327 A1* | 1/2015 | Hamada | B65H 75/44 242/376 |

FOREIGN PATENT DOCUMENTS

| | | |
|---|---|---|
| JP | 769538 A | 3/1995 |
| JP | 08-222339 A | 8/1996 |

(Continued)

OTHER PUBLICATIONS

International Search Report of PCT/JP2013/053674 dated Mar. 19, 2013.

(Continued)

*Primary Examiner* — Sang Kim
(74) *Attorney, Agent, or Firm* — Sughrue Mion, PLLC

(57) ABSTRACT

Provided is a flat cable winding device and an assembling method thereof, which can prevent slack of a flat cable and achieve smooth winding and leading out of the flat cable. A flat cable winding device includes a rotating table, a plurality of rollers, and a central shaft rotatably and pivotally supporting the rotating table. The central shaft includes an auxiliary wound portion in which the flat cable is wound for at least one turn. An inner wound portion is formed along an outer circumference of the auxiliary wound portion, and an outer wound portion is formed along outer circumferences of the plurality of rollers, thereby preventing the slack at the inner wound portion when leading out the flat cable.

6 Claims, 5 Drawing Sheets

(56) References Cited

FOREIGN PATENT DOCUMENTS

| | | |
|---|---|---|
| JP | 11-116145 A | 4/1999 |
| JP | 2001114476 A | 4/2001 |
| JP | 2004-328985 A | 11/2004 |

OTHER PUBLICATIONS

Communication dated Nov. 10, 2015, issued by the European Patent Office in corresponding European Application No. 13749213.8.
Communication dated Nov. 1, 2016, issued by the State Intellectual Property Office of the P.R.C. in corresponding Chinese Application No. 201380009466.1.

* cited by examiner

THE NUMBER OF WINDINGS OF THE AUXILIARY WOUND PORTION

THE SLACK OUTER DIAMETER Φ WHEN CHANGING
THE NUMBER OF WINDINGS OF THE AUXILIARY WOUND PORTION

FLAT CABLE WINDING DEVICE AND ASSEMBLING METHOD THEREOF

TECHNICAL FIELD

The present invention relates to a flat cable winding device for winding one end side of a flat cable and leading out another end side of the flat cable, and an assembling method of said flat cable winding device.

BACKGROUND ART

For example, an automobile and such employs a sliding seat, a slide door or the like arranged slidable with respect to a vehicle. The sliding seat is mounted with a seat sensor for detecting whether or not a passenger is seated and an electronic device such as a seat belt sensor for detecting whether or not a seat belt is fastened. The slide door is mounted with a drive motor for opening and closing a door window and an electronic device such as a door courtesy lamp for lighting one's feet when the door is opened. For this reason, the vehicle having a slide body such as a sliding seat or a slide door is provided with various electric wire wiring devices for wiring an electric wire from a vehicle body to the slide body or power supply devices, in order to connect an electronic device provided at the slide body side and an electronic device such as a control device provided at the vehicle body side.

In such electric wire wiring device, the electric wire (e.g., a flat cable or a flat harness) connecting the electronic device of the slide body side and the electronic device of the vehicle body side will have an extra length portion which is formed to the electric wire as the slide body slides. Thus, the winding device is used for winding up such extra length portion of the electric wire to prevent the electric wire from interfering with the slide body and such (for example, refer to Patent Literature 1). As shown in FIG. 7, a conventional flat cable winding device 100 disclosed in Patent Literature 1 is configured to wind up one end side of a flat cable C and lead out an another end side of the flat cable C, and includes a case 101 which is substantially cylindrical in entire shape, an inner annular wall 102 provided in the case 101 and retaining the one end side of the flat cable C, a rotor 103 configured to be guided by the inner annular wall 102 and rotatably arranged, and a coil spring 104 configured to bias the rotor 103 in a winding direction R of the flat cable C. The rotor 103 is provided with a plurality of rollers 105 arranged along a circumferential direction of the rotor 103.

The winding device 100 is configured such that, the one end side of the flat cable C introduced into the case 101 is reversed by one of the plurality of rollers 105 and retained in the inner annular wall 102, and the another end side of the flat cable C is led out to the outside of the case 101. Furthermore, the winding device 100 is configured to wind up the flat cable C by rotating the rotor 103 in the winding direction R by the biasing force of the coil spring 104, thereby winding the flat cable C around the inner annular wall 102 and around outer circumferences of the plurality of rollers 105. Meanwhile, when the another end side of the flat cable C is pulled by the sliding of the slide body, the rotor 103 is rotated in an opposite direction of the winding direction R, and the flat cable C wound around the inner annular wall 102 and the plurality of rollers 105 is unwound and led out to the outside of the case 101.

CITATION LIST

Patent Literature

Patent Literature 1: Japan Patent Application Publication No. 2004-328985

SUMMARY OF INVENTION

Technical Problem

However, the conventional winding device such as the one disclosed in Patent Literature 1 has a drawback that, when leading out the flat cable C, the flat cable C that had been wound around the inner annular wall 102 is slackened, and the slackened flat cable C could interfere with the rollers 105. Specifically, the slack of the flat cable C around the inner annular wall 102 is produced from a wound-up state shown in FIG. 8A in which the flat cable C is wound around the inner annular wall 102 and around the outer circumferences of the plurality of rollers 105 for a plurality of turns (e.g., three turns), respectively, to a state shown in FIG. 8B in which the rotor 103 is rotated for one rotation in the opposite direction of the winding direction R, and further to a state shown in FIG. 8C in which the rotor 103 is rotated for two rotations. Such slack is caused by the flat cable C unwound from the inner annular wall 102 being not delivered toward the rollers 105 due to the friction resistance induced in the flat cable C wound in an overlapping fashion around the outer circumferences of the plurality of rollers 105 and the friction resistance between the flat cable C and the rollers 105, for example. It is difficult to completely remove such slack of the flat cable C due to the structure of the winding device. Also, when the slackened flat cable C interferes with the roller 105 and such, the rotation of the rotor 103 is impeded and thus the winding and leading out of the flat cable C cannot be achieved smoothly.

Furthermore, the conventional winding device has a drawback that, when the flat cable C is led out, if the roller 105 has moved over a predetermined base point position (i.e. the position indicated by a solid line in FIG. 9) in a lead-out direction due to the lead-out momentum force, that is if the roller 105 has moved to a position indicated by an imaginary line (a double dotted line) in FIG. 9, or if the flat cable C becomes floppy, the flat cable C that had been wound around the inner annular wall 102 is bent at a retaining portion of the inner annular wall 102 and bent with a large curvature, thereby lowering the bending durability of the flat cable C.

Solution to Problem

Therefore, an object of the present invention is to provide a flat cable winding device and an assembling method of the flat cable winding device, which can prevent slack of a flat cable and achieve smooth winding and leading out of the flat cable, and which can improve bending durability of the flat cable.

Solution to Problem

In order to achieve the above-mentioned object, a first aspect of the present invention provides a flat cable winding device for winding one end side of a flat cable and leading out another end side of the flat cable, the flat cable winding device including: a case having an insertion hole through which the flat cable is inserted; a central shaft provided in the case and retaining the one end side of the flat cable; a rotating body configured to rotate about the central shaft; and a biasing element configured to bias the rotating body in a winding direction of the flat cable, wherein the rotating body includes a reversing roller configured to reverse the flat cable entered from the insertion hole of the case toward the central shaft, and a plurality of guide rollers arranged in a circumferential direction of the rotating body, wherein, when the rotating body which is biased by the biasing element is rotated in the winding direction, the flat cable is wound up so as to form an inner winding portion formed by the flat cable wound around the central shaft and an outer winding portion formed by the flat cable wound around outer circumferences of the reversing roller and the plurality of guide rollers, and wherein, in a state in which the flat cable is led out and the outer wound portion is unwound, the central shaft is provided with an auxiliary wound portion in which the flat cable is wound for at least one turn.

A second aspect of the present invention provides the flat cable winding device according to the first aspect, wherein the auxiliary wound portion is formed by winding the flat cable around the central shaft for three or more turns.

A third aspect of the present invention provides a flat cable winding device for winding one end side of a flat cable and leading out another end side of the flat cable, the flat cable winding device including: a case having an insertion hole through which the flat cable is inserted; a central shaft provided in the case and retaining the one end side of the flat cable; a rotating body configured to rotate about the central shaft; and a biasing element configured to bias the rotating body in a winding direction of the flat cable, wherein the rotating body includes a reversing roller configured to reverse the flat cable entered from the insertion hole of the case toward the central shaft, and a plurality of guide rollers arranged in a circumferential direction of the rotating body, wherein, when the rotating body which is biased by the biasing element is rotated in the winding direction, the flat cable is wound up so as to form an inner winding portion formed by the flat cable wound around the central shaft and an outer winding portion formed by the flat cable wound around outer circumferences of the reversing roller and the plurality of guide rollers, and wherein, in a state in which the flat cable is led out and the outer wound portion is unwound, the central shaft is provided with an auxiliary wound portion in which the flat cable is wound for at least half turn.

A fourth aspect of the present invention provides a method for assembling the flat cable winding device according to any one of the first to third aspects, including the steps of: after one end side of the flat cable is retained at the central shaft, forming the auxiliary wound portion by winding the flat cable around the central shaft for at least half turn; and leading out the another end side of the flat cable, which is extended across from the auxiliary wound portion to the reversing roller and reversed, from the insertion hole to outside of the case.

Advantageous Effect of Invention

According to the first aspect of the present invention, in the led-out state in which the flat cable is led out and the outer wound portion is unwound, there is provided the auxiliary wound portion formed by the flat cable wound around the central shaft for at least one turn. Thus, in a wound-up state in which the flat cable is wound up, the flat cable is wound around the central shaft additionally for the number of windings of the auxiliary wound portion. When leading out the flat cable from this wound-up state, the rotating body is rotated in an opposite direction of the winding direction and the outer wound portion is unwound and led outside of the case, and the rotating body and the central shaft are rotated with respect to each other and the inner wound portion is unwound, and this inner flat cable is delivered to an inner circumference side of the outer wound portion via the reversing roller. During this time, even if the inner flat cable is not sufficiently delivered to the outer wound portion due to the friction in the flat cable overlapped at the outer wound portion, or due to the friction between the outer wound portion and the inner flat cable unwound from the inner wound portion and delivered, since the extra length of the flat cable is reliably provided for the number of turns of the auxiliary wound portion, the slack can be inhibited by the length including this extra length. Consequently, the inner flat cable can be prevented from being largely slackened. Thus, the inner flat cable can be prevented from interfering with the roller and such and impeding the rotation of the rotating body, thereby achieving the smooth winding and leading out of the flat cable.

According to the second aspect of the present invention, the auxiliary wound portion is formed in advance by winding the flat cable for three or more turns. Thus, the longer extra length can be provided, thereby reducing the radially-outward slack of the inner flat cable.

According to the third aspect of the present invention, in the led-out state in which the flat cable is led out and the outer wound portion is unwound, there is provided the auxiliary wound portion formed by the flat cable wound around the central shaft for at least half turn. Thus, in a wound-up state in which the flat cable is wound up, the flat cable is wound around the central shaft additionally for the number of windings of the auxiliary wound portion. When leading out the flat cable from this wound-up state, the rotating body is rotated in an opposite direction of the winding direction and the outer wound portion is unwound and led outside of the case, and the rotating body and the central shaft are rotated with respect to each other and the inner wound portion is unwound, and this inner flat cable is delivered to an inner circumference side of the outer wound portion via the reversing roller. During this time, even if the inner flat cable is not sufficiently delivered to the outer wound portion due to the friction in the flat cable overlapped at the outer wound portion, or due to the friction between the outer wound portion and the inner flat cable unwound from the inner wound portion and delivered, since the extra length of the flat cable is reliably provided for the number of turns of the auxiliary wound portion, the slack can be inhibited by the length including this extra length. Consequently, the inner flat cable can be prevented from being largely slackened in the radially-outward direction. Thus, the inner flat cable can be prevented from interfering with the roller and such and impeding the rotation of the rotating body, thereby achieving the smooth winding and leading out of the flat cable.

According to the fourth aspect of the present invention, firstly the auxiliary wound portion is formed by winding the flat cable around the central shaft for at least half turn, and then the another end side of the flat cable is extended across the reversing roller and reversed and led out from the insertion hole to the outside of the case. Thus, the auxiliary wound portion can be reliably formed without slack.

DESCRIPTION OF EMBODIMENTS

A flat cable winding device according to one embodiment of the present invention is explained in referring to FIGS. 1 through 5. A flat cable winding device 1 is configured to wind up a flat cable 2 wired between a vehicle and a sliding seat slidably provided to a floor of the vehicle, for example. One end of the flat cable 2 is connected to a connector and such provided at the floor side, and another end side of the flat cable 2 is guided to a protector P guided along a slide rail and an another end of the flat cable 2 is connected to a connector and such at the sliding seat side via the protector P. This flat cable winding device 1 is provided near the slide rail, and is arranged to wind up the flat cable 2 as the protector P moves closer and lead out the flat cable 2 as the protector moves away, thereby preventing slack of the flat cable 2 between the flat cable winding device 1 and the protector P, thereby preventing the flat cable 2 from interfering with the sliding seat and such.

The flat cable 2 is formed into a thin band plate-like shape having flexibility, and includes a plurality of parallely-arranged core wires and an insulating cover covering the respective core wires. The core wire is formed by a plurality of twisted conducting wires, and the cover portion is made of synthetic resin. The length of the flat cable 2 is sufficiently longer than the sliding distance of the sliding seat. An one end side 2A of the flat cable 2 is passed inside of the flat cable winding device 1 and led out to the outside and connected to a connector and such at the floor. An another end side 2B of the flat cable 2 is connected to a connector and such at the sliding seat via the protector P. This embodiment shows an example of using the flat cable 2 having the plurality of parallely-arranged core wires; however, the flat cable may have any cross-sectional shape, and the configuration of the core wire and the insulating cover may be selected arbitrarily.

Figure 1:
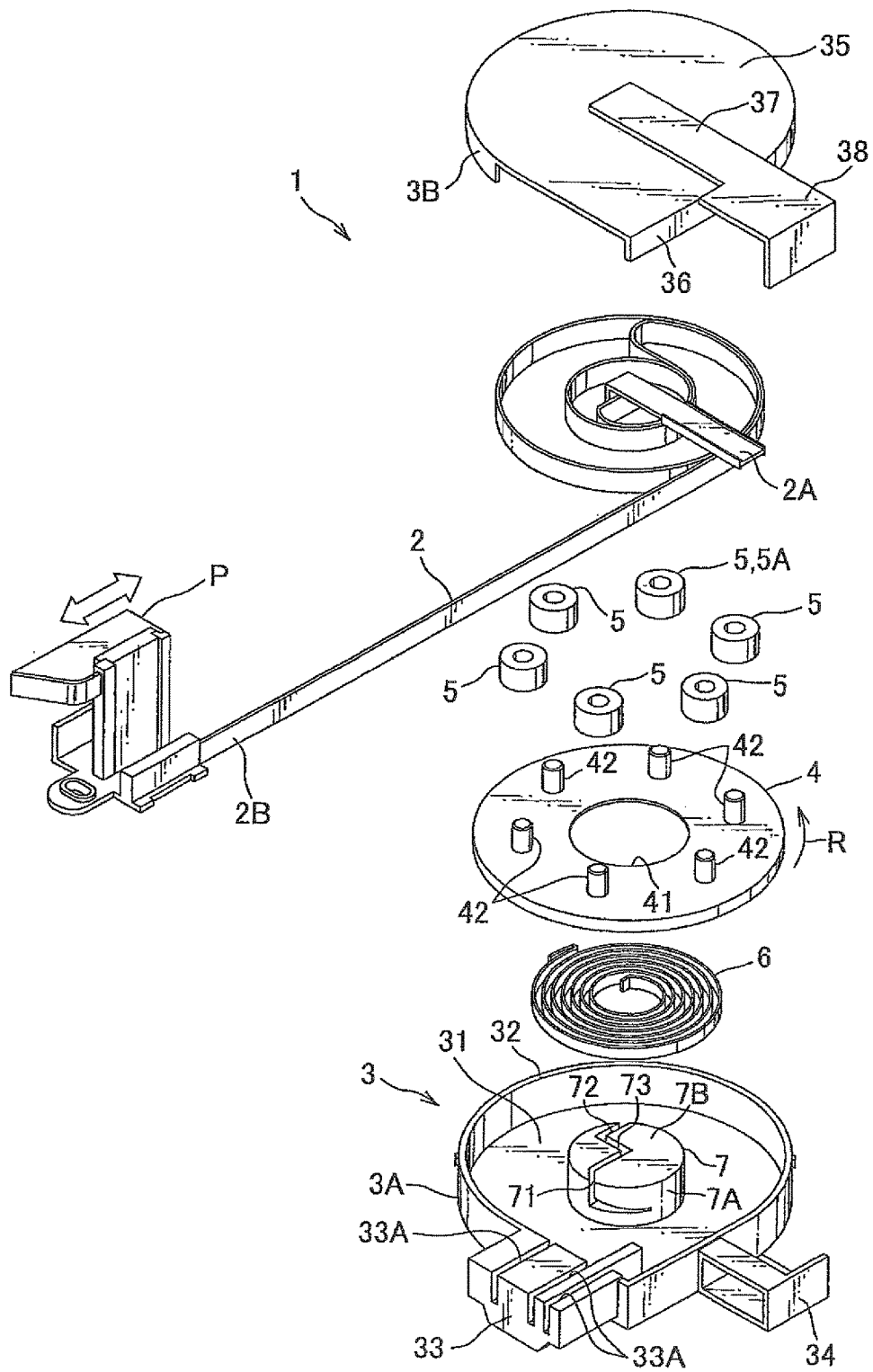
FIG. 1 is an exploded perspective view of a flat cable winding device according to one embodiment of the present invention.

As shown in FIG. 1, the flat cable winding device 1 includes a case 3 housing the wound flat cable 2, a rotating table 4 as a rotating body rotatably provided in the case 3, a plurality of (six, in this embodiment) rollers 5 rotatably supported on the rotating table 4, and a spiral spring 6 as a biasing element configured to bias the rotating table 4 in a winding direction R of the flat cable 2. The case 3 includes a lower case 3A housing the rotating table 4 and the spiral spring 6, and an upper case 3B configured to cover an upper face side of the lower case 3A so as to close the case 3 in a hollow fashion. A central shaft 7 which rotatably and pivotally supports the rotating table 4 is vertically arranged at a substantially center of the lower case 3A.

The lower case 3A is horizontally disposed on the floor of the vehicle, and includes a bottom portion 31 opposed to the floor, a peripheral wall 32 vertically arranged in a substantially cylindrical shape along an outer periphery of the bottom portion 31, a cable lead out portion 33 for leading out the another end side of the flat cable 2 to the outside, and a cable protection portion 34 for protecting the one end side 2A of the flat cable 2 drawn out from the case 3. The upper case 3B includes a substantially circular-disc-like top face portion 35, a hanging wall 36 hanging down in a substantially cylindrical fashion along an outer periphery of the top face portion 35 and arranged to overlap with the peripheral wall 32 of the lower case 3A, a cable guide portion 37 guiding the one end side of the flat cable 2 from the central shaft 7 to the cable protection portion 34, and a cover portion 38 covering an upper portion of the cable protection portion 34.

The central shaft 7 is vertically arranged at an internal face of the bottom portion 31 of the lower case 3A and is substantially columnar in entire shape, such that the rotating table 4 is rotatably supported by a circumferential face 7A of the central shaft 7. The central shaft 7 includes a slit 71 formed by being cut from the circumferential face 7A toward a center and opening to the upper face 7B, a locking groove 72 formed by being cut from an opposite side of the slit 71 and opening to the upper face 7B, and a communication groove 73 communicating the slit 71 and the locking groove 72, which together form a crank shape in planar view. The slit 71 locks the one end side 2A of the flat cable 2 by passing the one end side of the flat cable 2 therethrough. The one end side 2A of the flat cable 2 passed thorugh the slit 71 is passed through the communication groove 73 and bent, and then it is led out from the upper face 7B of the central shaft 7 and guided to the cable guide portion 37 of the upper case 3B. Then, the one end side 2A of the flat cable 2 is guided from the cable guide portion 37 to the cable protection portion 34 of the lower case 3A, led out to the outside of the case 3 and connected to a connector and such at the floor side.

The cable lead out portion 33 is arranged to project from the outer face of the peripheral wall 32 of the lower case 3A, and includes, at its upper face, a plurality of groove portions 33A for housing the flat cable 2. The plurality of groove portions 33A is arranged to communicate between inside and outside of the lower case 3A, and is extending linearly along a slide direction of the protector P. The flat cable 2 is passed through a predetermined one groove portion (i.e. insertion hole) 33A of the plurality of groove portions 33A, by which the another end side 2B of the flat cable 2 is wired from the inside to outside of the case 3. When winding the flat cable 2 to the inside of the case 3 or when leading out the flat cable 2 to the outside of the case 3, the flat cable 2 is guided along the groove portion 33A.

The rotating table 4 is formed into a circular disc-like shape in entire shape and includes, at its center, a hole 41 for passing the central shaft 7 therethrough. A plurality of (six, in this embodiment) boss portions 42 for rotatably supporting the rollers are formed on an upper face of the rotating table 4 and aligned at an equal interval along the circumferential direction. The plurality of rollers 5 is supported on the rotating table 4 by inserting the corresponding boss portions 42 through the rollers 5, so that the flat cable 2 is wound around the outer circumferences of the plurality of rollers 5. Of the plurality of rollers 5, one roller 5 is a reversing roller 5A configured to reverse the flat cable 2 introduced inside the case from the groove portion 33A toward the central shaft 7.

The spiral spring 6 is formed by spirally winding a wire metal having elasticity. An end of the spiral spring 6 adjacent to its center is passed through and fixed to the locking groove 72 of the central shaft 7, and an end of the spiral spring 6 at its outer periphery side is locked at a lower face of the rotating table 4, thereby biasing the rotating table 4 in the winding direction of the flat cable 2. That is, firstly, the rotating table 4 is rotated in a direction opposed to the winding direction R for a predetermined times so that the spiral spring 6 stores the biasing force, and after that, the flat cable 2 reversed by the reversing roller 5A is wound around the outer circumferences of the plurality of rollers 5. By doing so, the rotating table 4 is biased in the winding direction R by the restoring force of the spiral spring 6, and with this biasing force the flat cable 2 is wound by the central shaft 7 and the rotation table 4.

Figure 2:
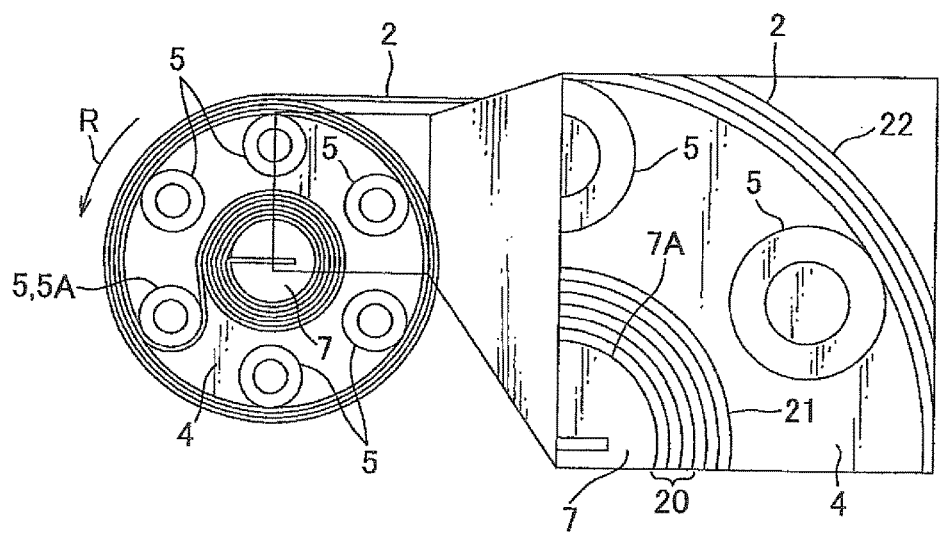
FIG. 2 is a plan view of a portion of the flat cable winding device.

In the following, a detailed structure and an operation of the flat cable winding device 1 is explained with reference to FIGS. 2, 3A-3C. As shown in FIG. 2, the central shaft 7 is provided with an auxiliary wound portion 20 formed by winding the flat cable 2 for at least one turn (three turns, in this embodiment). This auxiliary wound portion 20 is formed by winding the flat cable 2 locked to the slit 71 around a circumferential face 7A of the central shaft 7, and after the auxiliary wound portion 20 is formed, the flat cable 2 reversed by the reversing roller 5A is led out from the groove portion 33A to the outside of the case 3. As described above, when the rotating table 4 is rotated in the winding direction R by the restoring force of the spiral spring 6, the flat cable 2 is wound around an outer circumference of the auxiliary wound portion 20 of the central shaft 7 and around the outer circumferences of the plurality of rollers 5 of the rotating table 4, thereby forming an inner wound portion 21 which is formed by the flat cable 2 wound around the outer circumference of the auxiliary wound portion 20 and an outer wound portion 22 which is formed by the flat cable 2 wound around the outer periphery of the plurality of rollers 5.

Figures 3A, 3B, 3C:
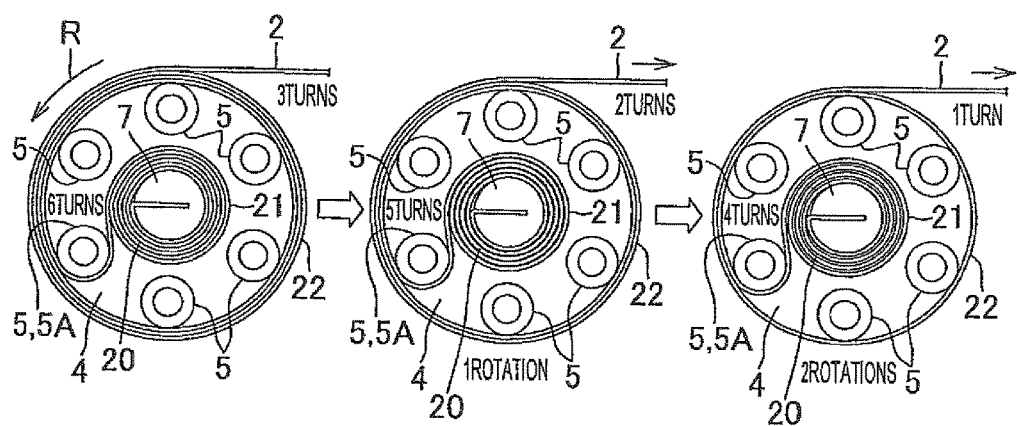
FIG. 3A illustrates operation of the flat cable winding device.
FIG. 3B illustrates operation of the flat cable winding device.
FIG. 3C illustrates operation of the flat cable winding device.

For example, in a state in which the flat cable 2 is wound up inside of the case 3 as shown in FIG. 3A, the flat cable 2 is wound at the inner wound portion 21 and the outer wound portion 22 for three turns, respectively. Thus, the flat cable 2 is wound around the central shaft 7 for total of six turns, including the three turns for the auxiliary wound portion 20. From this wound state, when one turn of the flat cable 2 is led out from the outer wound portion 22, substantially one turn of the flat cable 2 from the inner wound portion 21 is also delivered to the outer wound portion 22. Furthermore, as shown in FIG. 3C, the flat cable 2 is led out from the outer wound portion 22, and the flat cable 2 is delivered from the inner wound portion 21 to the outer wound portion 22, thereby sequentially leading out the flat cable 2 to the outside of the case 3.

Figure 4:
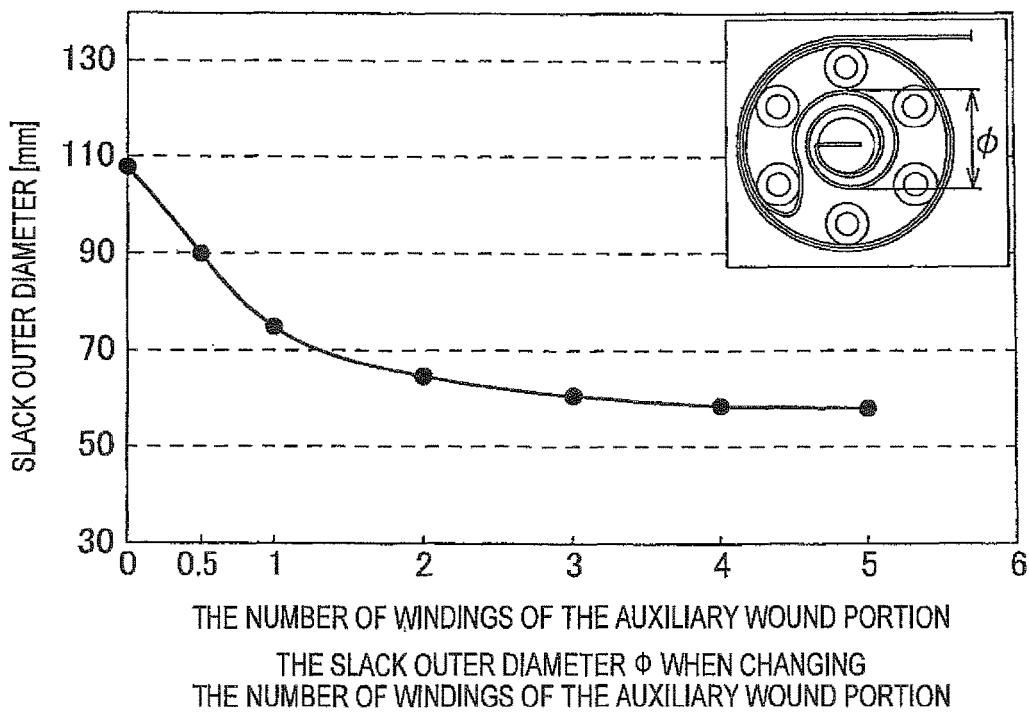
FIG. 4 is a graph showing effect of the flat cable winding device.

During such lead out operation, if the flat cable 2 is not sufficiently delivered from the inner wound portion 21 to the outer wound portion 22 due to the friction resistance in the flat cable 2 wound in an overlapping fashion in the outer wound portion 22, slack of the flat cable 2 is produced at the inner wound portion 21. In regard to such slack of the flat cable 2, FIG. 4 indicates a measurement result showing the relationship between a number of windings of the auxiliary wound portion 20 and a slack outer diameter ($\phi$). A diameter of the central shaft 7 of the flat cable winding device 1 used in the measurement is 30 mm, and the slack outer diameter ($\phi$) is measured under a condition of winding three pieces of the flat cable 2 together. As shown in FIG. 4, when the auxiliary wound portion 20 is not provided (that is, a number of windings is zero), the slack outer diameter ($\phi$) is about 110 mm. That is, it was found that the slack having the diameter of 3.6 or more times of the diameter of the central shaft 7 is produced. On the other hand, by setting the number of windings of the auxiliary wound portion 20 to one, the slack outer diameter ($\phi$) is reduced to 70 mm, and by setting the number of the windings to two, the slack outer diameter is reduced to 70 mm or less, i.e. reduced to 2.2 times or less of the diameter of the central shaft 7. Furthermore, by setting the number of windings of the auxiliary wound portion 20 to three or more, the slack outer diameter ($\phi$) is reduced to about 60 mm, i.e. reduced to about 2 times or less of the diameter of the central shaft 7.

According to the above-mentioned measurement results, it was found that, by setting the number of the windings of the auxiliary wound portion 20 to three or more, the slack of the flat cable 2 at the inner wound portion 21 can be significantly reduced. Therefore, by reducing the slack of the flat cable 2 by forming the auxiliary wound portion 20, the flat cable 2 can be prevented from interfering with the rotating table 4 or the roller 5, thereby achieving smooth winding and leading out of the flat cable 2. In addition, even when the number of windings of the auxiliary wound portion 20 is increased to four or more, the reduction in the slack of the flat cable 2 is small compared to when the number of windings is three. Thus, in order to reduce the slack for an entire length of the flat cable 2, it is preferable that the number of windings of the auxiliary wound portion 20 is at least about three.

Figure 5:
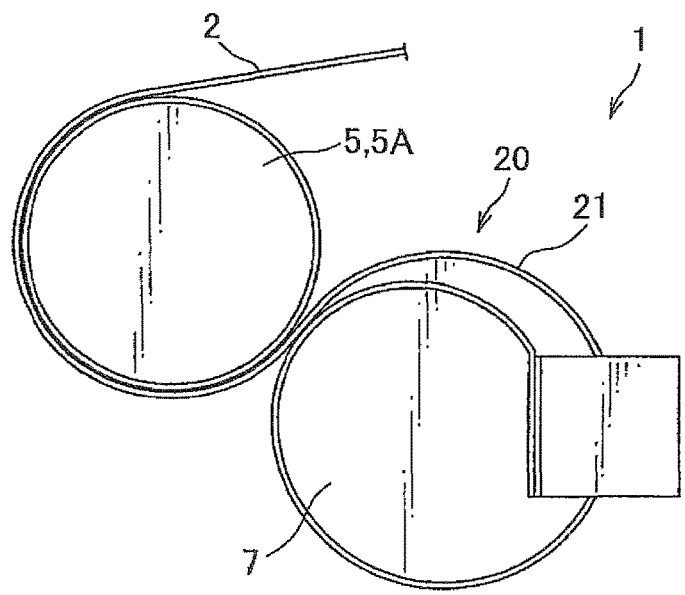
FIG. 5 is a partial plan view showing another effect of the flat cable winding device.

Furthermore, as shown in FIG. 5, if the number of windings of the auxiliary wound portion 20 is set to one or more, the inner wound portion 21 is left wound around the central shaft 7 after the flat cable C is led out. Thus, the flat cable C is not bent by the slit 71 of the central shaft 7, thereby maintaining the bending curvature of the flat cable C small (i.e. the bending radius is large). Thus, the bending durability of the flat cable C can be improved, and also, damage to the flat cable C by the slit 71 can be prevented since the reversing roller 5A cannot move past the location of the slit 71 of the central shaft 7.

Figure 6:
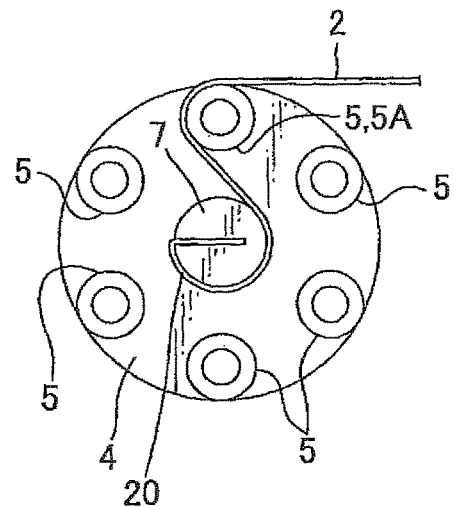
FIG. 6 illustrates operation of a modified example of the flat cable winding device.
Figure 7:
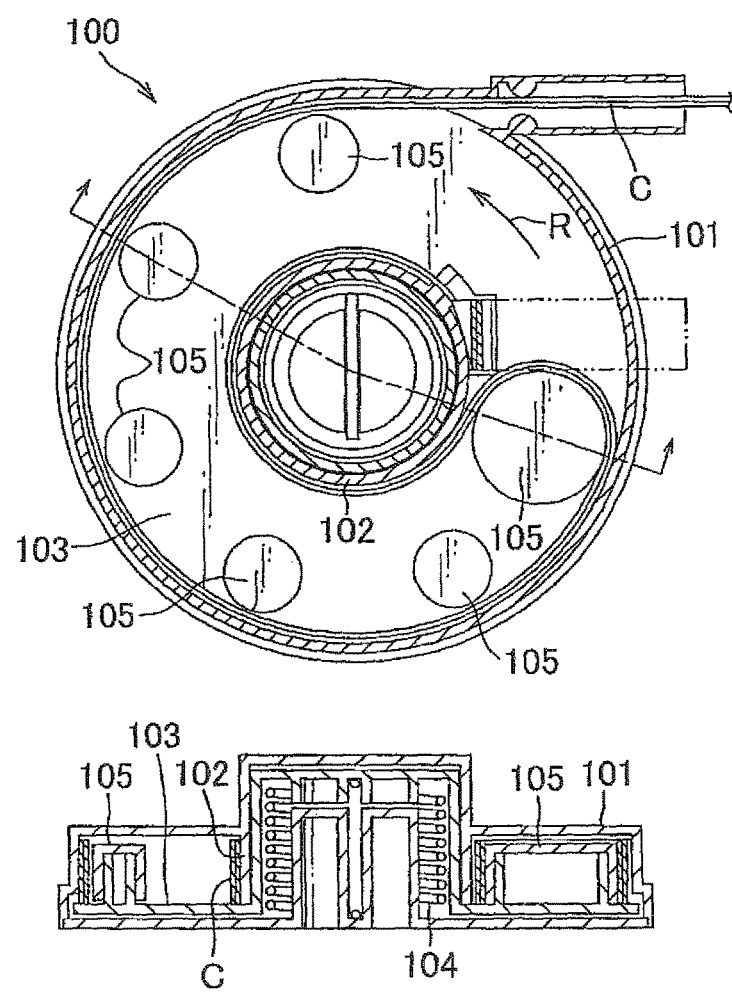
FIG. 7 is a cross sectional view of a conventional flat cable winding device.
Figure 8A:
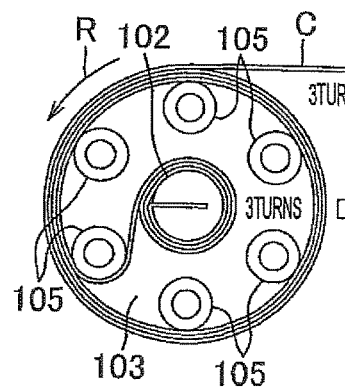
FIG. 8A illustrates operation of the conventional flat cable winding device.
Figure 8B:
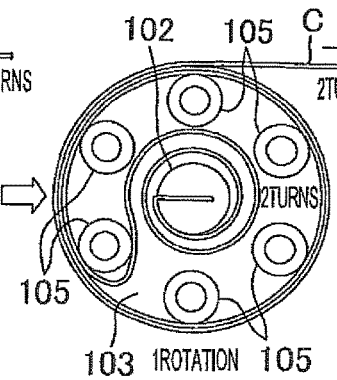
FIG. 8B illustrates operation of the conventional flat cable winding device.
Figure 8C:
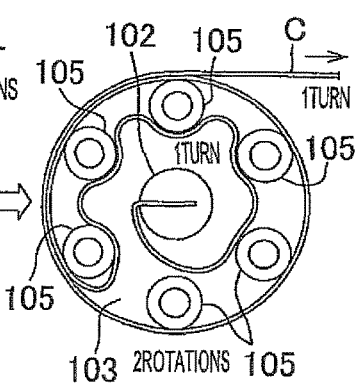
FIG. 8C illustrates operation of the conventional flat cable winding device.
Figure 9:
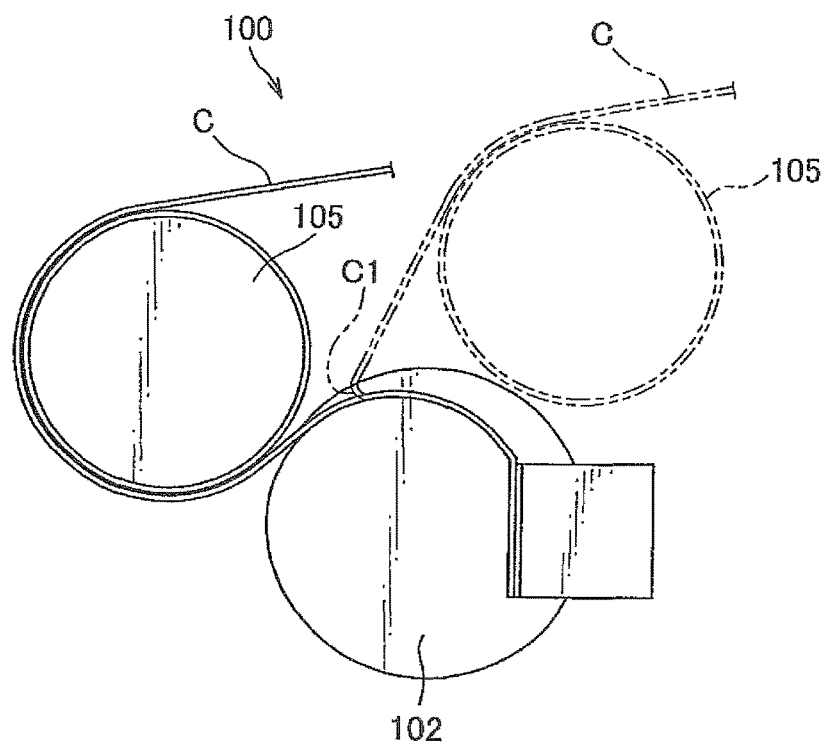
FIG. 9 is a partial plan view showing an example of malfunction of the conventional flat cable winding device.

In the flat cable winding device 1 described above, the central shaft 7 is provided with the auxiliary wound portion 20 formed by the flat cable 2 wound for at least one turn (three turns, in the embodiment). However, as a modified example of the flat cable winding device shown in FIG. 6, the central shaft 7 may be provided with the auxiliary wound portion 20 formed by the flat cable 2 wound for at least half turn (half turn, in the shown example).

As shown in the graph of FIG. 4, when the auxiliary wound portion 20 is not provided (i.e. the number of windings is zero), the slack outer diameter ($\phi$) is about 110 mm, that is, the slack having a diameter of 3.6 or more times of the diameter of the central shaft 7 is produced; however, it was found that by setting the number of the windings of the auxiliary wound portion 20 to 0.5 (i.e. the auxiliary wound portion 20 includes the flat cable 2 wound for half turn), the slack outer diameter ($\phi$) is reduced to 90 mm.

The aforementioned embodiment is only a representative embodiment of the present invention, and the present invention is not limited of this embodiment. That is, the present invention can be modified and performed in various ways without departing from the gist of the present invention.

For example, although the above-described embodiment shows the flat cable winding device 1 used for an electric wire wiring device for sliding seat, a winding device according to the present invention may be used, not just for an electric wire wiring device for sliding seat, but for an electric wire wiring device for slide door, and may be used for a wiring device for wiring an electric wire at a rotatable opening/closing door or a bonnet. Furthermore, a winding device according to the present invention may be used, not just for a vehicle, but for a wiring device for wiring an electric wire across a movable part of an equipment or a device having various movable parts. Furthermore, although the above-described embodiment shows the winding device 1 for winding the single flat cable 2 for simplicity, the present invention may be used for a winding device for winding plurality of flat cables 2 bundled together.

LIST OF REFERENCE SIGNS

1 flat cable winding device
2 flat cable
3 case
4 rotating table (rotating body)
5 roller
5A reversing roller
6 spiral spring (biasing element)
7 central shaft
20 auxiliary wound portion
21 inner wound portion
22 outer wound portion

The invention claimed is:

1. A flat cable winding device for winding one end side of a flat cable and leading out another end side of the flat cable, the flat cable winding device comprising:
    a case having an insertion hole through which the flat cable is inserted;
    a central shaft provided in the case and retaining the one end side of the flat cable;
    a rotating body configured to rotate about the central shaft; and
    a biasing element configured to bias the rotating body in a winding direction of the flat cable,
    wherein the rotating body includes a reversing roller configured to reverse the flat cable entered from the insertion hole of the case toward the central shaft, and a plurality of guide rollers arranged in a circumferential direction of the rotating body,
    wherein, when the rotating body which is biased by the biasing element is rotated in the winding direction, the flat cable is wound up so as to form an inner winding portion formed by the flat cable wound around the central shaft and an outer winding portion formed by the flat cable wound around outer circumferences of the reversing roller and the plurality of guide rollers, and
    wherein, in a state in which any portion of the flat cable is not in contact with the plurality of guide rollers, the central shaft is provided with an auxiliary wound portion in which the flat cable is wound for at least one turn about the central shaft.

2. The flat cable winding device according to claim 1, wherein the auxiliary wound portion is formed by winding the flat cable around the central shaft for three or more turns.

3. A flat cable winding device for winding one end side of a flat cable and leading out another end side of the flat cable, the flat cable winding device comprising:
    a case having an insertion hole through which the flat cable is inserted;
    a central shaft provided in the case and retaining the one end side of the flat cable;
    a rotating body configured to rotate about the central shaft; and
    a biasing element configured to bias the rotating body in a winding direction of the flat cable,
    wherein the rotating body includes a reversing roller configured to reverse the flat cable entered from the insertion hole of the case toward the central shaft, and a plurality of guide rollers arranged in a circumferential direction of the rotating body,
    wherein, when the rotating body which is biased by the biasing element is rotated in the winding direction, the flat cable is wound up so as to form an inner winding portion formed by the flat cable wound around the central shaft and an outer winding portion formed by the flat cable wound around outer circumferences of the reversing roller and the plurality of guide rollers, and
    wherein, in a state in which any portion of the flat cable is not in contact with the plurality of guide rollers, the central shaft is provided with an auxiliary wound portion in which the flat cable is wound for at least half turn about the central shaft.

4. A method for assembling the flat cable winding device according to claim 1, comprising the steps of:
    after one end side of the flat cable is retained at the central shaft, forming the auxiliary wound portion by winding the flat cable around the central shaft for at least half turn; and
    leading out the another end side of the flat cable, which is extended across from the auxiliary wound portion to the reversing roller and reversed, from the insertion hole to outside of the case.

5. A method for assembling the flat cable winding device according to claim 2, comprising the steps of:
    after one end side of the flat cable is retained at the central shaft, forming the auxiliary wound portion by winding the flat cable around the central shaft for at least half turn; and
    leading out the another end side of the flat cable, which is extended across from the auxiliary wound portion to the reversing roller and reversed, from the insertion hole to outside of the case.

6. A method for assembling the flat cable winding device according to claim 3, comprising the steps of:
    after one end side of the flat cable is retained at the central shaft, forming the auxiliary wound portion by winding the flat cable around the central shaft for at least half turn; and
    leading out the another end side of the flat cable, which is extended across from the auxiliary wound portion to the reversing roller and reversed, from the insertion hole to outside of the case.

* * * * *